(12) United States Patent
Evans et al.

(10) Patent No.: US 6,479,023 B1
(45) Date of Patent: Nov. 12, 2002

(54) SYSTEM FOR CONVERTING PARTICULATE MATTER IN GASOLINE ENGINE EXHAUST GASES

(75) Inventors: Julia Margaret Evans, Wallingford (GB); Stephen Poulston, Reading (GB); Raj Rao Rajaram, Slough (GB); Andrew Peter Walker, Royston (GB)

(73) Assignee: Johnson Matthey Public Limited Company, London (GB)

( * ) Notice: Subject to any disclaimer, the term of this patent is extended or adjusted under 35 U.S.C. 154(b) by 36 days.

(21) Appl. No.: 09/638,283

(22) Filed: Aug. 14, 2000

(30) Foreign Application Priority Data

Aug. 14, 1999 (GB) .............................................. 9919200

(51) Int. Cl.$^7$ ................................................. B01J 19/08
(52) U.S. Cl. .................. 422/186.04; 204/177; 204/164; 60/275
(58) Field of Search ..................... 422/186.04; 204/164, 204/177; 60/275

(56) References Cited

U.S. PATENT DOCUMENTS

| | | |
|---|---|---|
| 4,902,487 A | 2/1990 | Cooper et al. |
| 5,100,632 A | 3/1992 | Dettling et al. |
| 5,711,147 A | 1/1998 | Vogtlin et al. |
| 5,746,984 A | 5/1998 | Hoard |
| 5,807,526 A | 9/1998 | Miljevic |
| 5,893,267 A | 4/1999 | Vogtlin et al. |

FOREIGN PATENT DOCUMENTS

| | | |
|---|---|---|
| GB | 2 270 013 | 3/1994 |
| GB | 2 274 412 | 7/1994 |
| JP | 06-343820 | 12/1994 |
| WO | WO 99/18333 | 4/1999 |
| WO | WO 00/21646 | 4/2000 |
| WO | 00/43102 | 7/2000 |

OTHER PUBLICATIONS

European Search Report dated May 15, 2001.
British Search Report, issued Dec. 17, 1999; for corresponding UK patent GB 9919200.7.

*Primary Examiner*—Kishor Mayekar
(74) *Attorney, Agent, or Firm*—RatnerPrestia

(57) ABSTRACT

A system for converting particulate matter in exhaust gases, which system comprises a stoichiometrically-operated engine and an exhaust system including a plasma generator for converting water vapor in the exhaust gases into an oxidant and a filter downstream of the plasma generator. A method for converting particulate matter (PM) in exhaust gases by using plasma-treated water vapor as an oxidant to convert PM trapped on a filter disposed in an exhaust system, and/or to oxidize NO and/or $N_2$ to $NO_2$, in which water vapor, PM, NO and $N_2$ are present in the exhaust gases of a stoichiometrically-operated gasoline engine. The $NO_2$ is then used to combust the PM. Experimentally, the conversion of a gaseous hydrocarbon using a plasma with and without water vapor present can be followed using mass spectrometry.

14 Claims, 3 Drawing Sheets

SYSTEM FOR CONVERTING PARTICULATE MATTER IN GASOLINE ENGINE EXHAUST GASES

FIELD OF THE INVENTION

This invention relates to a system and a method for converting particulate matter in exhaust gases from stoichiometrically-operated gasoline engines.

BACKGROUND OF THE INVENTION

Gasoline engines are in widespread use in all types of vehicles and stationary power sources. Because of their combustion characteristics they generate particulate matter (PM) that can be a solid, fine droplets of liquid or a mixture of the two. The PM may comprise a variety of products from the combustion event, such as unburned hydrocarbons (HC) and sulfuric acid produced by the oxidation of sulfur dioxide derived from sulfur species present in the fuel. Although less visible to the naked eye than PM produced by diesel engines, PM generated by gasoline engines is potentially more harmful to humans. Due to the small particle size, PM penetrates deep into alveolar passages within the lung. This has been linked with causing lung cancer. Diesel exhaust gases also contain other components which need to be treated to meet emission legislation, including NOx.

In order to meet emission legislation, it has become commonplace to fit gasoline vehicles with a catalytic converter called a three-way catalyst (TWC). The most common TWCs use a platinum group metal (PGM), such as one or more of Pt, Pd and Rh, carried on an oxidic, high surface area washcoat, which can be one or more of $Al_2O_3$, $CeO_2$, $ZrO_2$ or mixtures of any two or more thereof. The support for the catalyst is generally a low pressure-drop flow-through honeycomb monolith, manufactured from an extended ceramic e.g. cordierite, or from a metal. However, the TWC achieves only partial removal of PM.

The removal of PM can also be achieved using some form of filter or trap, which may be cleaned or regenerated intermittently or continuously. A particulate trap may itself be catalyzed to lower the PM combustion temperature and some form of external heating, for example electric heating of the trap or of the air fed thereto may be used to initiate PM combustion. It has also been suggested to include a catalyst in the fuel to the engine, and, as well as PGMs, iron, copper or cerium compounds have been suggested as potential catalytic materials.

However, the application of these prior art suggestions to stoichiometrically-operated engines are associated with one or more problems including inadequate removal of PM compared with control of NOx, excessive cost, reduced fuel economy and incompatibility with existing technology.

A successful particulate trap for use in diesel applications is marketed by Johnson Matthey Plc as the "Continuously Regenerating Trap" (CRT™) and is described in U.S. Pat. No. 4,902,487. The system uses $NO_2$ derived from oxidizing NOx in the exhaust gas to combust PM disposed on a filter. This is advantageous for diesel applications since $NO_2$ can combust PM at about 250° C., and the temperature of diesel exhaust is generally up to 350° C. However, a temperature of up to about 650° C. is required to combust PM in $O_2$.

The use of the Continuously Regenerating Trap is generally limited to diesel applications because typically there is not enough oxygen present in the exhaust from gasoline engines to effect the oxidation of NO to $NO_2$ as any $O_2$ present reacts preferentially with other exhaust gas components such as CO, hydrogen, and hydrocarbons. Gasoline engines, other than gasoline direct injections (GDI) engines, normally function under stoichiometric or slightly rich conditions.

By "stoichiometric" is meant the point at which there is theoretically enough oxygen to consume all of the hydrocarbons and carbon monoxide in the combustion event. The point occurs at an air to fuel ratio of about 14.7. Under stoichiometric conditions, the exhaust gas is neither reducing nor oxidizing in nature. An exhaust gas can be described as "rich" when it is reducing in nature owing to the presence of fuel residues from the combustion event i.e. the air to fuel ratio at combustion was less than that at the stoichiometric point. "Lean" exhaust gas conditions result when the air to fuel ratio during combustion is greater than at the stoichiometric point. Lean exhaust gases include excess oxygen and little or no hydrocarbons because of near complete combustion of the hydrocarbon fuel and the exhaust gases will be oxidizing in nature as a result. In practice, the exhaust gases of an engine set up to run at the stoichiometric point will vary slightly in composition because of macro-fluctuations about the neutral non-oxidizing/non-reducing norm of stoichiometry e.g. when the engine is idling (slightly lean) or being used to accelerate a vehicle (slightly rich). But on average, the exhaust gases are non-oxidizing and non-reducing. For ease of description the use of the term "stoichiometric" or "stoichiometrically" hereinafter embraces conditions in which there are macro-fluctuations around the true stoichiometric air to fuel ratio, and the composition of the exhaust gases varies accordingly.

WO 99/18333 describes a method and apparatus for using free radicals generated by action of a plasma generator on water vapor in an exhaust gas to enhance the action of a TWC on the oxidation of unburned HC and CO and the reduction of NOx.

U.S. Pat. No. 5,746,984 describes an exhaust system for use in combination with a lean-burn engine such as a gasoline direct injection engine including a NOx trap, an HC trap, a particulate trap and a plasma generator. In the system, trapped NOx and HC components are released under rich conditions and are carried to the plasma generator where the unburned HC, NOx and PM are destroyed using plasma.

Our WO 00/21646 describes a system for the purification of exhaust gases in diesel engines, which system includes a plasma generator and a filter or particulate trap. This system is for treating exhaust gases from diesel and other lean-burn engines.

We are not aware of any efforts having been made specifically to remove PM from exhaust gases of stoichiometrically-operated engines.

SUMMARY OF THE INVENTION

We have now discovered that, by treating water vapor present in exhaust gases from a stoichiometrically-operated gasoline engine with a plasma, the plasma-treated water vapor can be used to convert PM, which can be disposed on a filter, and/or to oxidize NO to $NO_2$. The $NO_2$ is then used to combust the PM.

in the presence of plasma, with and without water vapor present. The solid line shows the results wherein water is present and the dotted line shows the results with no water present. (a) indicates that the plasma is switched on, and (b) that the plasma is switched off.

Figure 3:
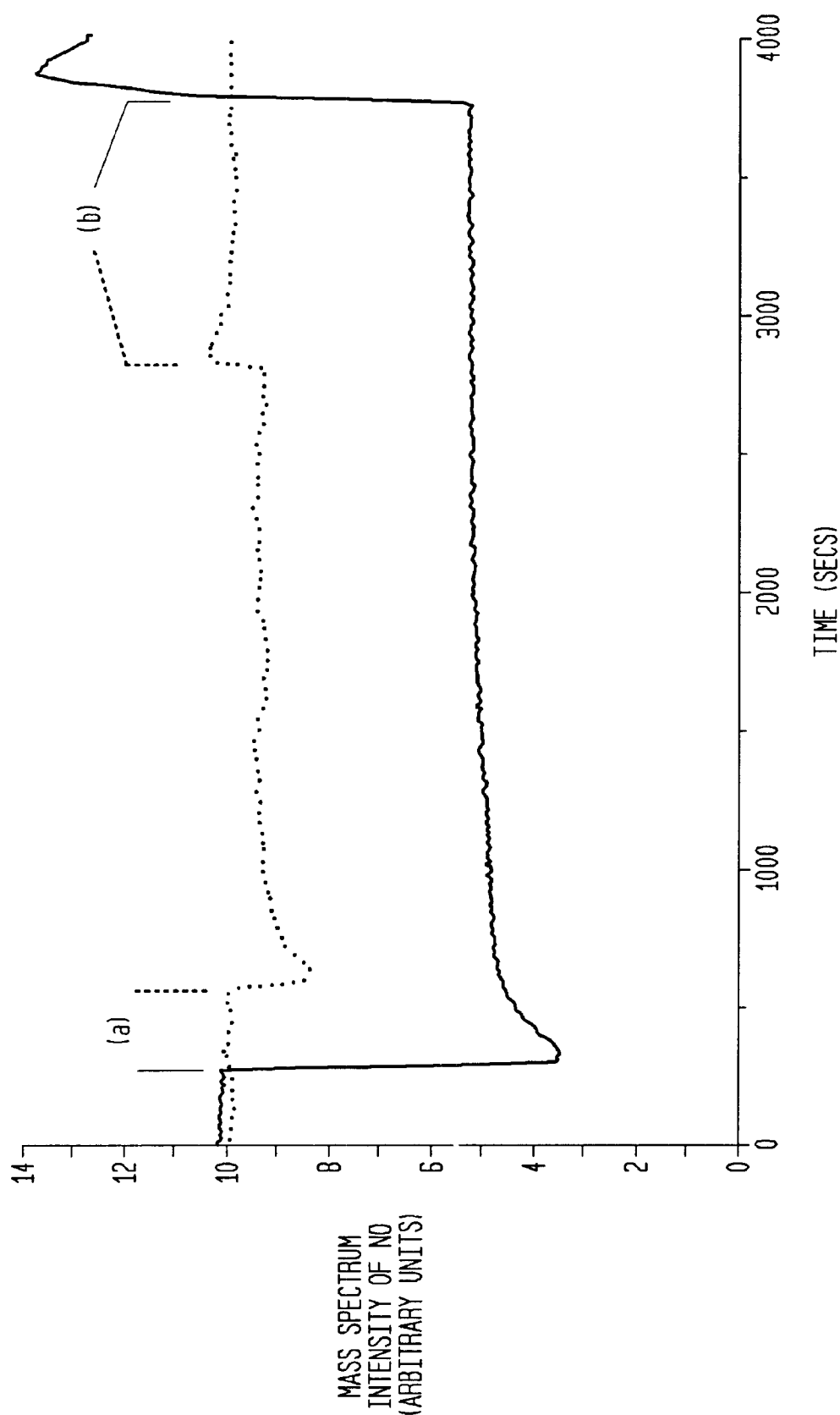

FIG. 3 is a graph showing the intensity of NO as measured by mass spectrometry in arbitrary units (vertical axis) versus time/sec. (horizontal axis) in the presence of plasma, with and without water present. The solid line shows the results obtained when water vapor is present and the dotted line shows the results with no water vapor is present. (a) indicates that the plasma is switched on, and (b) that the plasma is switched off.

Figure 4:
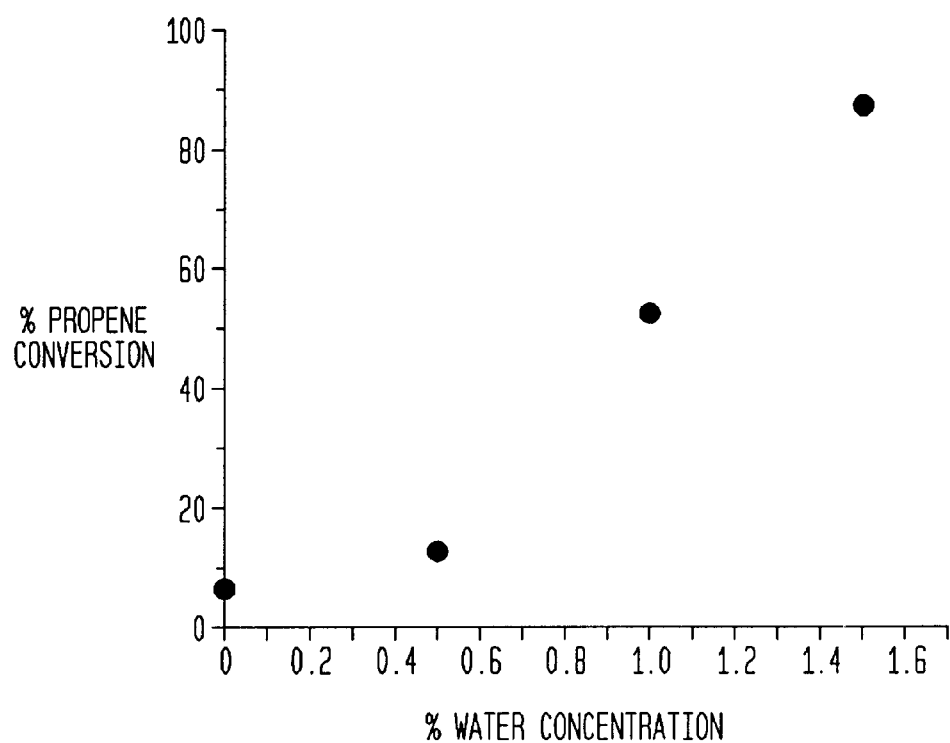

FIG. 4 is a graph showing the relationship between % propene conversion (vertical axis) and the % water concentration (horizonal axis).

DETAILED DESCRIPTION OF THE INVENTION

According to one aspect, the present invention provides a method for converting particulate matter in exhaust gases by using plasma-treated water vapor as an oxidant to convert particulate matter (PM) trapped on a filter disposed in an exhaust system, and/or to oxidize NO and/or $N_2$ to $NO_2$, in which water vapor, PM, NO and $N_2$ are present in the exhaust gases of a stoichiometrically-operated gasoline engine. The $NO_2$ is then used to combust the PM.

The present invention has the advantage that the benefits of the CRT™ are brought to exhaust systems of stoichiometrically-operated gasoline engines. Furthermore, it has been reported that the oxidation of NO to $NO_2$ by plasma occurs without oxidizing $SO_2$ to $SO_3$ which can limit the application of CRT™ in diesel systems to low sulfur content fuels i.e. <50 ppm. We believe that the present invention enables use of the CRT™ concept with fuels of higher sulfur content more typical of gasoline currently available i.e. ~350 ppm.

For the avoidance of doubt, by "stoichiometrically-operated gasoline engine" we mean an engine which is designed to be operated wholly stoichiometrically, and not e.g. run lean during part of the engine cycle, and stoichiometrically during the remaining part. Non-stoichiometrically operated engines include gasoline-direct injection engines, engines in which the exhaust system includes a NOx trap or partial lean-burn gasoline engines in which stoichiometric operation occurs e.g. during acceleration or motorway driving.

For the purposes of the present invention, a plasma is a gas in which there are free electrons, radicals and ionized molecules, atoms and molecules in various states of excitation. It is a gas consisting of positive and negative charges which has a tendency to remain overall electrically neutral. In a non-thermal plasma, the mean energy of an electron is considerably higher than those of the other components of the gas.

It is believed, although we do not wish to be bound by any theory, that in the present invention $NO_2$ may be generated only by oxidation of NO in the exhaust gases, but also by oxidation of nitrogen to yield NO, which is itself then converted to $NO_2$. It should also be understood that the oxidant catalytically generated from NO or $N_2$ is not necessarily all $NO_2$. It may be, in whole or part, $N_2O_5$, $N_2O$ or equivalent oxidant derived from NO in the exhaust. For ease of reference, however, the oxidant is simply referred to herein as $NO_2$.

Generally, the concentration of water vapor will be around 5%. A further preferred use of the invention is that some of the water vapor in the exhaust gas is derived from a source other than the combustion of the gasoline. This has the advantage that the amount of plasma-treated water vapor oxidant present in the exhaust gas can be adjusted to suit the particular load on the engine and hence the levels of NOx and/or PM present in the exhaust gas. The source can be a supply means controlled by the vehicle's engine control unit (ECU). One way of adjusting the level of additional water vapor input into the exhaust gas is by negative-feedback and positive-feedback from sensors present in the exhaust system as part of the vehicle's on-board diagnostics (OBD). Alternatively, the level of water vapor-addition can be pre-programmed to a particular set of conditions e.g. engine revolutions and/or acceleration and stored in the ECU as maps.

Preferably, the invention further comprises the use of the oxidation of the NO and/or $N_2$ to $NO_2$ to promote NOx or hydrocarbon light-off over a catalyst consisting of an oxidation catalyst.

Light-off over a catalyst is the temperature at which the catalyst is 50% efficient in catalyzing a reaction. $NO_2$ is generally more reactive than NO, so the conversion of NO to $NO_2$ can promote NOx light-off. Under stoichiometric conditions, however, the conversion of NO to $NO_2$ is very difficult using conventional catalytic techniques because $O_2$ reacts preferentially with CO, hydrogen and gaseous hydrocarbons. Accordingly, the use of the present invention to make $NO_2$ can also be used to promote light-off over a suitable oxidation catalyst for both NOx and hydrocarbons.

In a further aspect, the invention provides a system for converting PM in an exhaust gas, which system comprises a stoichiometrically-operated engine and an exhaust system including a plasma generator for converting water vapor in the exhaust gas into an oxidant an a filter downstream of the plasma generator. Preferably, the plasma generator and the filer are close-coupled, i.e. positioned immediately adjacent to one another. In a further preferred feature, the system can include means for supplying water vapor upstream of the plasma generator.

Preferably, the system further comprises a catalyst consisting of an oxidation catalyst, which can be Pt or Pd or mixtures of the two, but is preferable Pt.

The plasma generator can be of any suitable type. For example, it may be of the corona discharge, surface plasma discharge, or dielectric barrier discharge type, or a dielectric packed bed, or an electron beam reactor. The plasma generator can be enhanced by electromagnetic radiation, such as microwave radiation. Optionally, it maybe positioned to treat all or a portion of the exhaust gases.

The filter used may be, for example, a woven or knitted wire filter, or a wall flow filter of generally known type. For certain vehicles, especially light cars or vans, it may be necessary or desirable to use a filter design which collects only 80% or so by weight of the total PM.

Preferably, the filter is catalyzed, and when catalyzed we prefer a base metal catalyst most preferably a combination of lanthanum, caesium and vanadium pentoxide or Pt on MgO.

In order that the invention may be more fully understood, an Example is provided by way of illustration only and with reference to the drawings.

EXAMPLE 1

To exemplify the invention, we studied the conversion of the hydrocarbon propene. Propene is a gas at room temperature and pressure. However, the propene was chosen because it is very difficult to replicate PM conversion by plasma-treated water vapor or combustion by $NO_2$ generated by plasma-treated water vapor in the laboratory for safety reasons. However, the results herein will show the general application of the present invention to hydrocarbons such as in a hydrocarbon-rich particulate, and to its application in our CRT™ concept. For further details of CRT™, reference should be made to the Examples in U.S. Pat. No. 4,902,487.

The conversion of propene using plasma in the presence and absence of water was measured against time on a test rig using synthetic gas mixtures. The test rig 10, shown in FIG. 1, includes an electrified packed bed plasma generator 12 of alumina spheres (not shown) of approximately 3 mm diameter coated with barium-titanate catalyst. The catalyst bed was of approximately 10 mm thickness and was disposed between two metal electrodes 14, 16 inside a ceramic tube 18 (internal diameter 50 mm). The packed bed is retained between a machineable ceramic insert 20 and a spring 21. The tub 18 is rendered gas tight by use of viton gaskets 22. One electrode 16 was earthed and a 50 Hz sinusoidal AC voltage of ~3 kV (RMS) was applied to the other electrode 14. Both the gas mixture and plasma generator were at ambient temperature. The amount of the propene and NO in both the substrate and product gas mixtures were measured using mass spectrometry. Data collection was made once a second.

The synthetic gas mixture comprised 300 ppm NO, 12% $O_2$/He and, when present, a water vapor concentration of 1% v/v. The total gas flow rate was 250 ml/min giving a gas hourly space velocity (GHSV) of ~100 $hr^{31\ 1}$.

Figure 1:
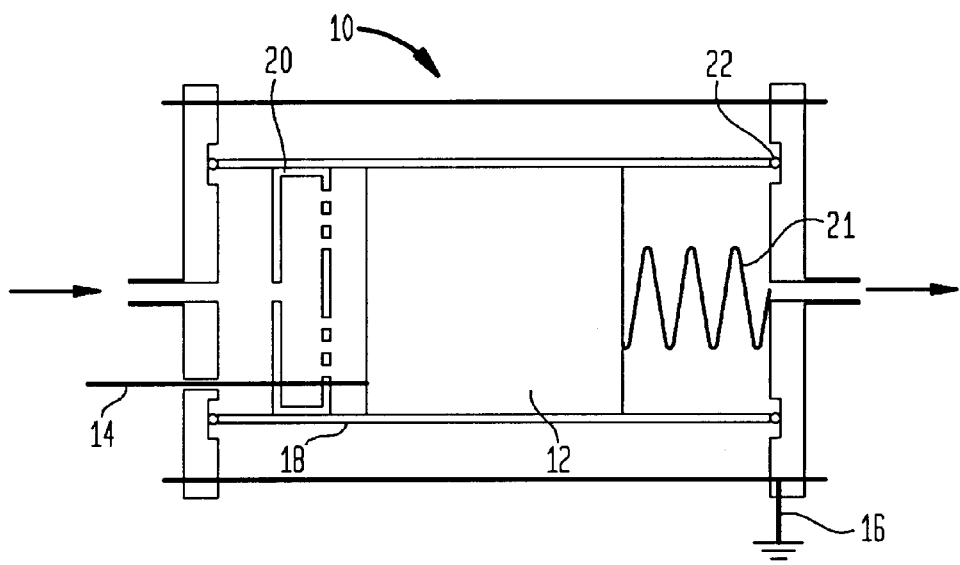
FIG. 1 is a schematic diagram of a laboratory test rig.

The results shown in FIG. 1 clearly indicate that in the presence of plasma, the conversion of propene as measured against time is significantly greater where water vapor is present.

Figure 2:
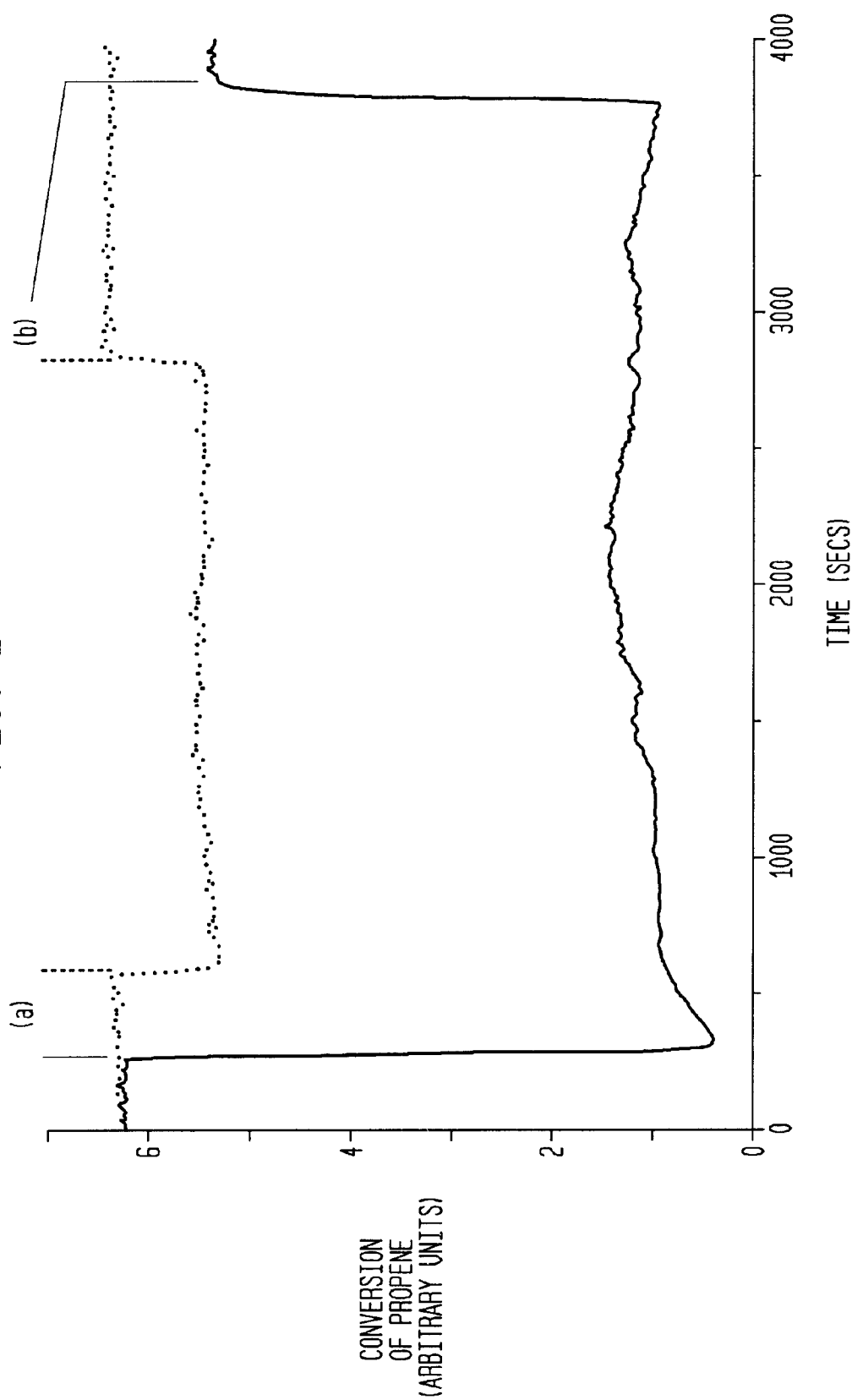
FIG. 2 is a graph showing the conversion of the hydrocarbon propene as measured by mass spectrometry in arbitrary units (verticals axis) versus time/sec. (horizontal axis)

FIG. 2 clearly shows that the NO intensity, as measured by mass spectrometry, decreases significantly more in the presence of water than in its absence. This is consistent with the finding that plasma-treated water vapor acts as an oxidant. In fact, we believe that the conversion of NO was more efficient by up to 5% than as shown in the results since a conversion product of propene, formaldehyde, is co-resolved with the NO in mass spectrometry.

EXAMPLE 2

Example 1 was repeated varying the % water vapor concentration in the substrate gas mixture. Water vapor concentrations at 0.5% v/v and 1.5% v/v were tested. The results presented in FIG. 3 clearly show that the correlation between the % propene conversion and the water vapor concentration in the substrate gas mixture.

What is claimed is:

1. A method for converting particulate matter trapped on a filter disposed in an exhaust system of a stoichiometrically-operated gasoline engine system, the method comprising the steps of oxidizing at least one of NO and $N_2$ present in the exhaust gas by treating the NO and $N_2$ with plasma-treated water vapor to form $NO_2$, and combusting the particulate matter with the $NO_2$.

2. A method according to claim 1 wherein at least some of the water vapor in the exhaust gas is derived from a source other than the combustion of the gasoline.

3. A method according to claim 1 or 2, wherein $NO_2$ generated is used to promote light-off of a catalyst consisting of an oxidation catalyst for $NO_x$ and hydrocarbons.

4. A system for converting particulate matter in an exhaust gas, said system comprising a stoichiometrically-operated engine and an exhaust system including a plasma generator for converting water vapor in the exhaust gas into an oxidant and a filter downstream of said plasma generator.

5. A system according to claim 4, wherein said plasma generator is selected from the group consisting of a corona discharge plasma generator, surface plasma discharge plasma generator, a dielectric barrier discharge plasma generator, a dielectric packed bed plasma generator, and an electron beam reactor plasma generator.

6. A system according to claim 4 or 5, wherein said plasma generator and said filter are close-coupled to one another.

7. A system according to claim 4 or 5, further comprising a catalyst consisting of an oxidation catalyst.

8. A system according to claim 7, wherein said oxidation catalyst is selected from the group consisting of Pt, Pd, and a mixture thereof.

9. A system according to claim 4 or 5, further including means for supplying water vapor upstream of said plasma generator.

10. A system according to claim 9, wherein said filter comprises a filter catalyst.

11. A system according to claim 10, wherein said filter catalyst comprises a base metal catalyst.

12. A system according to claim 8, wherein said oxidation catalyst is Pt.

13. A system according to claim 11, wherein said base metal catalyst is $La/Cs/V_2O_5$.

14. A system according to claim 11, wherein said base metal is Pt on MgO.

* * * * *

UNITED STATES PATENT AND TRADEMARK OFFICE
CERTIFICATE OF CORRECTION

PATENT NO.    : 6,479,023 B1
DATED         : November 12, 2002
INVENTOR(S)   : Julia Margaret Evans et al.

It is certified that error appears in the above-identified patent and that said Letters Patent is hereby corrected as shown below:

<u>Column 6,</u>
Lines 24 and 25, delete "surface plasma discharge plasma generator", and insert therefor -- a surface plasma discharge plasma generator --.

Signed and Sealed this

Seventh Day of October, 2003

JAMES E. ROGAN
*Director of the United States Patent and Trademark Office*